US008037766B2

(12) United States Patent
Bercoff et al.

(10) Patent No.: US 8,037,766 B2
(45) Date of Patent: Oct. 18, 2011

(54) METHOD FOR GENERATION MECHANICAL WAVES BY GENERATION OF INTERFACIAL ACOUSTIC RADIATION FORCE

(75) Inventors: Jérémy Bercoff, Aix en Provence (FR); Claude Cohen-Bacrie, Ventabren (FR); Mathieu Pernot, Paris (FR); David Savery, Cabries (FR)

(73) Assignee: Super Sonic Imagine (FR)

( * ) Notice: Subject to any disclaimer, the term of this patent is extended or adjusted under 35 U.S.C. 154(b) by 703 days.

(21) Appl. No.: 12/092,406

(22) PCT Filed: Oct. 25, 2007

(86) PCT No.: PCT/FR2007/052247

§ 371 (c)(1),
(2), (4) Date: May 1, 2008

(87) PCT Pub. No.: WO2008/050072

PCT Pub. Date: May 2, 2008

(65) Prior Publication Data

US 2008/0276709 A1 Nov. 13, 2008

Related U.S. Application Data

(60) Provisional application No. 60/883,233, filed on Jan. 3, 2007.

(30) Foreign Application Priority Data

Oct. 25, 2006 (FR) ..................................... 06 54502

(51) Int. Cl.
*G01N 29/06* (2006.01)
*G01N 29/28* (2006.01)

(52) U.S. Cl. ............ 73/644; 73/606; 600/442; 600/443; 600/459; 600/472

(58) Field of Classification Search .................... 73/603, 73/605, 606, 642, 644; 600/442, 443, 459, 600/472
See application file for complete search history.

(56) References Cited

U.S. PATENT DOCUMENTS

| | | | | |
|---|---|---|---|---|
| 4,452,084 | A * | 6/1984 | Taenzer | 73/609 |
| 5,477,736 | A | 12/1995 | Lorraine | |
| 2005/0080469 | A1 * | 4/2005 | Larson et al. | 607/101 |
| 2005/0149008 | A1 * | 7/2005 | Larson et al. | 606/27 |
| 2005/0229707 | A1 * | 10/2005 | Oravecz et al. | 73/589 |
| 2008/0006091 | A1 * | 1/2008 | McKeon | 73/627 |

FOREIGN PATENT DOCUMENTS

| | | | |
|---|---|---|---|
| DE | 42 29 531 | A1 | 3/1994 |
| EP | 1 354 561 | A1 | 10/2003 |

OTHER PUBLICATIONS

International Search Report regarding Application No. PCT/FR2007/052247dated Apr. 28, 2008.

* cited by examiner

*Primary Examiner* — Hezron E Williams
*Assistant Examiner* — Rose M Miller
(74) *Attorney, Agent, or Firm* — Caesar, Rivise, Bernstein, Cohen & Pokotilow, Ltd.

(57) ABSTRACT

The present invention relates to a method for generating mechanical waves within a viscoelastic medium (11) comprising a step of generating an acoustic radiation force (15) within the viscoelastic medium (11) by application of acoustic waves focused on an interface (13) delimiting two zones (11, 14) having distinct acoustic properties.

12 Claims, 2 Drawing Sheets

METHOD FOR GENERATION MECHANICAL WAVES BY GENERATION OF INTERFACIAL ACOUSTIC RADIATION FORCE

CROSS-REFERENCE TO RELATED APPLICATIONS

This national stage application claims the benefit under 35 U.S.C. §371 of International Application No. PCT/FR07/052247 filed on Oct. 25, 2007, entitled METHOD FOR GENERATION OF MECHANICAL WAVES BY GENERATION OF INTERFACIAL ACOUSTIC RADIATION FORCE, which in turn takes its priority from French Application No. 06 54502 filed on Oct. 25, 2006, and U.S. Provisional Application No. 60/883,233 filed on Jan. 3, 2007 and all of whose entire disclosures are incorporated by reference herein.

BACKGROUND TO THE INVENTION

The present invention relates to the general field of the medical imaging.

1. FIELD OF INVENTION

More particularly, the invention applies to the generation of mechanical waves in a viscoelastic medium, with such mechanical waves being likely to be imaged in order to determine the properties of the viscoelastic medium.

The present invention therefore relates more precisely to the field of elastography.

2. DESCRIPTION OF RELATED ART

This medical imaging technique maps the mechanical properties of a viscoelastic medium and quantifies the rheology of the viscoelastic medium. According to this technique, a mechanical stimulus is generated and causes displacement of the tissues. The spatiotemporal response of the tissue to this mechanical excitation is then measured. The spatiotemporal response is advantageously measured using an imaging modality, for example by echography or magnetic resonance, etc.

Once the movement resulting from the mechanical excitation is known, it is possible to determine the mechanical properties of the medium.

In transitory elastography, the mechanical excitation consists of a short mechanical pulse or a low number of pulses created either on the surface of the body, or inside the tissue itself.

The quality of transitory elastography images depends crucially on the amplitude of the shifts possible to be generated by exciting mechanical stimulation.

It is evident in transitory elastography by external stress, that the amplitude in shift is limited only by the maximum surface vibration which can be induced at contact of the medium without damaging it. The resulting shifts in tissue easily have amplitudes of the order of 100 μm.

In this way, and in general, shifts resulting from mechanical excitation must be sufficient to be measurable with the fewest errors, at the same time being limited to avoid any harmful effect in the medium, especially in the case of biological tissue.

The generated power is therefore satisfactory, though it is known that use of external stress creates technical problems, such as the space requirement of the device necessary for this stress, synchronisation of the mechanical excitation with the imaging, localisation of the mechanical excitation, optimisation of the amplitude of the wave in the zones of interest in depth, etc.

There is also transitory elastography where the mechanical stress of the medium observed is created by an acoustic radiation force. This radiation force is obtained by focusing an ultrasound beam inside the medium. Focusing the beam can take place here in a single zone of the medium or successively in a plurality of zones of the medium.

The focal spot, on which the ultrasound beam converges, is then moved at a speed greater than the propagation speed of the elastic waves to generate an elastic shift wave of maximum amplitude of the order of 10 to 100 μm.

This shift wave propagates in the medium. Measuring the propagation properties of the wave, observed by echography, MRI or some other imaging modality, determines mechanical variables characteristic of the tissues investigated. It is possible to determine, inter alia, a shearing module or even viscosity, etc.

The shift engendered by the acoustic radiation force is connected to the energy deposited in the tissue, and the amplitude of the mechanical wave generated is therefore limited by the maximum acoustic power which can be sent in the observed medium without thermally or mechanically altering the tissue.

The ultrasound solution offers simple handling, reproducibility of the manner in which the stress is generated, assurance as to synchronisation of excitation with imaging and assurance as to localisation of the excitation, but suffers from a lack of power.

AIM AND SUMMARY OF THE INVENTION

The main aim of the present invention therefore is to eliminate such disadvantages by proposing a method for generation of mechanical waves within a viscoelastic medium, comprising a step for generation of an acoustic radiation force within the viscoelastic medium by application of acoustic waves focussed on an interface delimiting two zones having distinct acoustic properties.

With such a method for generation of mechanical waves within a viscoelastic medium, the amplitudes of the shifts caused are greater than with simple ultrasound stress by focusing within tissue.

According to the invention, acoustic waves are focussed at the depth and in the direction of a surface interface.

The interface on which the acoustic waves are focussed can be a gel/skin or water/skin or even water/membrane/skin separation surface, etc. The membrane can be a deformable membrane or not. The interface can also be situated between a solid medium and a liquid medium inside the imaged tissue, or between two media of different acoustic properties inside the tissue. This is the case, for example, with a biological medium comprising a cyst. With the method according to the invention, the amplitude of the shifts generated is of the order of 100 μm.

According to a preferred embodiment of the invention, the step for generation of an acoustic radiation force is coupled with an imaging step of the medium, the coupling being such that propagation of the mechanical waves generated in the medium is imaged.

Imaging of the propagation of waves can be completed in one, two or three dimensions. In such a preferred embodiment, elastography measurement of the medium is performed. This is the preferred application of the invention, with focusing on the interface according to the invention enabling remarkable improvement in the quality of the imaging undertaken.

According to an advantageous characteristic, the acoustic waves are ultrasound waves.

The ultrasound frequencies are actually particularly adapted to generation of a radiation force especially for creating shearing waves within a medium. Such shearing waves are commonly used in elastography. Such shearing waves belong to mechanical waves such as generated according to the method of the invention and they are the ones imaged in general according to elastographic methods.

According to a particular characteristic, the interface on which the acoustic waves are focussed is an interface present between two zones of distinct acoustic properties present within the viscoelastic medium.

With such a characteristic the visibility and characterization of the interfacial zones within a medium are considerably improved. In fact, observation of the propagation of the shearing waves created at the level of the interfaces that are naturally present in the human body helps to characterize even better these interfaces and the media which they separate.

This characteristic will therefore be particularly interesting in the case of the presence of a liquid cyst, blood vessels or even structures harder than soft tissue, such as bones and cartilage.

According to another particular characteristic of the invention, the interface on which the acoustic waves are focussed is an artificial membrane placed in contact with the surface of the viscoelastic medium and enclosing a medium known as coupling medium, placed between a device for applying the acoustic waves and the surface of the viscoelastic medium, the coupling medium and the viscoelastic medium defining two zones of distinct acoustic properties.

This characteristic proves particularly interesting in the applications since the presence of an artificial medium is necessary. This is the case, in particular, in therapy methods by ultrasound focussed where a fine membrane enclosing a coupling medium is generally used to make contact with the biological tissue.

According to the invention, it is thus possible to use such an interface to generate shearing waves. Following excitation, an elastographic mode is advantageously used and imaging of the medium and of the propagation of the shearing waves is performed. In this way, the viscoelastic properties of the tissue are then evaluated and monitored during therapeutic treatment.

Such monitoring is particularly pertinent, as it is well known that the elasticity of biological tissues changes when they are denatured after cellular thermal necrosis.

According to an advantageous characteristic, the artificial membrane has a composition selected so as to minimize the acoustic impedance contrast while increasing the amplitude of the mechanical waves.

According to another advantageous characteristic, the artificial membrane has a thickness selected to minimize the acoustic impedance contrast while increasing the amplitude of the mechanical waves.

These latter two characteristics easily adapt an artificial membrane according to the particular application by modifying its composition, its form and/or its thickness.

It eventuates that the method for generating mechanical waves according to the invention is of major interest for imaging the elasticity of the superficial zones of the biological media.

In fact, as the shearing waves are generated at the interface, this produces waves of amplitude significant at the level of the surface of the tissue. This characteristic is not possible to realize with the volume radiation pressure technique since the generated waves generally reach the surface of the medium highly attenuated.

Using an artificial membrane, for example the membrane of a water pocket generates a mechanical pulse at a predetermine site on the surface of the medium. The technique according to the invention is therefore highly interesting for elastographic imaging of the skin, for example at the level of melanoma or superficial lesions such as for example certain breast lesions.

However, it can be interesting to be able to generate shearing waves at depth in a medium.

Thus, according to a particularly advantageous characteristic of the invention, the artificial membrane has a non-uniform composition, determined spatially so as to increase the amplitude of the mechanical waves in a region of interest of the viscoelastic medium.

Alternatively or in addition to the preceding characteristic, the artificial membrane can have a non-uniform thickness determined spatially so as to increase the amplitude of the mechanical waves in a region of interest of the viscoelastic medium.

With these characteristics of the membrane, it is possible to use the directivity of the shearing waves to concentrate the mechanical waves in a zone of interest. The amplitude of the mechanical waves in this zone is therefore all the greater.

It is also possible that application of acoustic waves focussed on an interface delimiting two zones having distinct acoustic properties is undertaken successively at a plurality of points of the interface, this plurality of points and the succession of the focusing being determined so as to increase the amplitude of the mechanical waves in a region of interest of the viscoelastic medium.

With this dynamic focusing characteristic a pattern can be designed on the interface. According to the form of this pattern, the amplitude of the mechanical waves in a certain zone of interest is amplified by an interference phenomenon. In the dynamic succession of the focusing of ultrasound beams, the relative delay of each ultrasound beam focussed on a given point is selected carefully so that the interference is positive at the level of the zone of interest. The mechanical shearing waves are then like focussed in the zone of interest.

In an advantageous application of the invention, the method is coupled with a method of ultrasound treatment so that the effect of the treatment can be monitored.

Advantageously, the method of ultrasound treatment is suitable for being controlled as a function of the results of the imaging step of the medium.

The invention also relates to an artificial membrane to be placed partially in contact with the surface of a viscoelastic medium and intended to enclose a medium known as coupling medium placed between a device for generation of acoustic waves and a viscoelastic medium to serve as interface during execution of a method according to the invention.

BRIEF DESCRIPTION OF THE DRAWINGS

Other characteristics and advantages of the present invention will emerge more clearly from the following description, given by way of illustration and non-limiting, in reference to the attached drawings in which.

DETAILED DESCRIPTION OF THE EMBODIMENTS OF THE INVENTION

Figure 1:
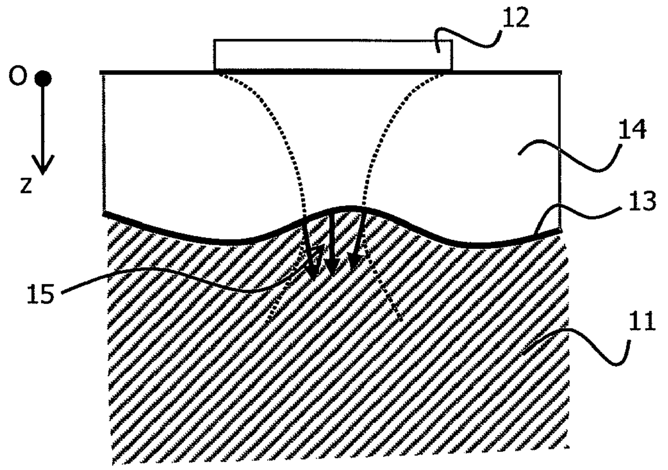
FIG. 1 schematically illustrates generation of mechanical waves according to the method of the invention, FIG. 2 schematically illustrates the directivity of the shearing waves in a biological medium.

FIG. 1 schematically illustrates generation of mechanical waves in a medium 11 using a method according to the invention. In this figure, the method is applied by means of a transducer 12 applying acoustic waves focussed at the level of an interface 13. FIG. 1 conventionally illustrates focusing of the waves in the plane by two dotted lines substantially hyperbolic and symmetrical relative to the median line of the transducer 12 and approaching one another at the depth of focusing. According to the method of the invention, this depth of focusing is precisely selected as corresponding to the depth of the interface.

The focussed waves are advantageously ultrasound waves. In the example of FIG. 1, the interface 13 is produced using an artificial membrane enclosing an artificial medium 14.

The quantity transfers of movements between the media 14 and 11 create an acoustic radiation force 15 which, supporting on the interface 13 of the medium 11, will thrust the latter and generate a mechanical wave within the medium 11.

According to the invention, the medium is therefore mechanically stimulated using an acoustic radiation force 15 generated at the interface 13 of two media 11 and 14 having different acoustic properties.

The acoustic radiation force is a phenomenon characteristic of all acoustic propagation. Applied to an elementary volume V, located in the propagation medium 11, it is created following a non-zero balance between the inlet and outlet quantity flow of movement carried by the acoustic wave. This non-zero balance averaged on numerous ultrasound cycles results in a force F described by:

$$F = \left\langle -\int_V (\rho v v \cdot n + p n)\, dS \right\rangle,$$

where ρ designates the density of the medium, p the pressure, v the elementary speed, n the unitary vector perpendicular to an element dS of the surface of the volume V, and the hooks designate the average time.

Therefore, so as to compare the amplitudes of the acoustic radiation force engendered by focusing inside a medium and of the radiation force obtained with focusing on an interface, there is cause for interest in the volume radiation forces generated by absorption of the acoustic energy and in the surface radiation forces generated at the interface of media having different properties of velocity and density.

In considering the propagation of an acoustic wave of intensity I and speed c in a certain direction Oz in a dissipative medium with an ultrasound absorption coefficient noted as α, it is common to express the radiation force by its volume density f according to the formula:

$$f = 2\alpha I e_z / c.$$

In addition, the propagation of an ultrasound wave in a first medium 14 up to an interface 13 with a medium 11 is considered.

Due to a particular effect of the interface 13, a surface radiation force 15 is generated locally on the interface 13, causing a shift of the medium 11 situated nearby.

This thrust of the interface generates, as seen previously, mechanical waves of major amplitude which spread in the biological medium 11.

Created by a plane incident ultrasound wave perpendicularly to the interface 13, the radiation force 15 per surface unit at the interface 13, noted π, can be written (according to Shutilov VA, Fundamental Physics of Ultrasound, p 133, CRC, 1988) as:

$$\pi = \frac{I}{c_{14}}\left(1 + R - (1 - R)\frac{c_{14}}{c_{11}}\right),$$

where R is the reflection coefficient (in terms of energy) of the interface 13, $c_{14}$ and $c_{11}$ are the ultrasound velocities in the media 14 and 11, and I is the energy of the incident ultrasound beam.

In considering a particular volume V of height H in the medium 11, a particular volume whereof one of the borders coincides with the interface 13 on a section A, it is possible to compare the relative contributions of the two types of forces generated when a plane wave of intensity I spreads in the particular volume V of the medium 14.

The volume V is then subjected to a volume force $F_{vol}$ due to acoustic absorption in the medium 11, and subjected to a surface force $F_{surf}$ on the section A due to the contrast between the two media 14 and 11. The surface force $F_{surf}$ is written as $$F_{surf} = \pi A = \frac{IA}{c_{14}}\left(1 + R - (1 - R)\frac{c_{14}}{c_{11}}\right),$$

the volume radiation force created by absorption can be written as a first approximation $F_{vol} = fAH = 2\alpha_{11} I / c_{14} AH(1-R)$, In reality, these orders of magnitude of force are applied to a focal demi zone centred axially on the interface 13 having a section A equal to the thickness of the focussed acoustic beam and having a height H equal to a demi depth of field.

The ratio of the two forces acting on the focal volume zone can then be written as:

$$F_{surf} / F_{vol} = (1 + \gamma_c)\frac{1 + R - (1 - R)/(1 + \gamma_c)}{2\alpha_{11} H(1 - R)}.$$

Since the contrasts R and $$\frac{c_{11}}{c_{14}} - 1 = \gamma_c$$

are low, then the ratio of the two forces is expressed as:

$$F_{surf} / F_{vol} \approx \frac{2R - \gamma_c}{2\alpha_{11} H}.$$

The values assumed by this ratio depend mainly on the choice of the material of which the interface 13 is made. The term $2R-\gamma_c$ is in effect a function of this choice of interface material. As for the term $2\alpha_{11}H$, by taking the depth of field of a transducer with number of openings $$\frac{F}{D} = 1$$

and central frequency 5 MHz, and in view of the typical attenuation in the breast (1 dB/MHz/cm), the result is $2\alpha_{11}H \approx 0.12$. It is therefore evident that it suffices to select the interface material such that $2R_{-\gamma c}$ is of the order of 0.25, such that the surface force is twice the amplitude of the volume force.

With this aim, in order to increase the velocity contrast, an elastic membrane can be used, for example. Such a membrane could for example be made of latex, polyurethane, silicone, etc. It is evident that latex is particularly well adapted for making a membrane useful for the invention.

Advantageously, the transducer 12 is suitable for conducting an ultra-rapid imaging step of the medium 11. According to the transducer, the image can be bidimensional or tridimensional. It can be also reduced to one dimension (a sight line) if a simple motionless transducer element is employed. This ultra-rapid ultrasound imaging step is coupled with the application step of the ultrasound waves focussed at the level of the membrane 13. The occurrences of these steps are then synchronized as a function of the propagation speed of the mechanical waves created by application of ultrasound waves.

With a view to obtaining a high-quality image, there is therefore cause to ensure that the reflection coefficient is limited at the level of the interface 13, so as not to damage the ultrasound imaging due to loss of transmitted energy. This means selecting a medium enclosed by the membrane having an impedance close to that of the medium to be imaged, effectively minimizing reflection at the interface. Examples of suitable materials are given hereinbelow.

Since the invention focuses specially on elastography, there is cause for interest in particular in generating shearing waves at the interface 13, using the method according to the invention.

So as to specify the characteristics of the shift field corresponding to the mechanical waves resulting from surface excitation, there is cause for interest in the theory of propagation of elastic waves induced by stress at the surface of a semi-infinite solid.

Such a semi-infinite solid is an isotropic elastic propagation medium 11. Four types of waves can be propagated: three volume waves and a surface wave. The volume waves are made up of a head wave, a compression wave and a shearing wave.

With respect to shearing waves, calculating the Green function (according to Gakenheimer and Miklowitz, Transient excitation of a half space by a point load travelling on the surface I, J. Appl. Mech., 1969) shows that shearing waves generated in the volume exhibit lobes of directivity. This comes from the dipolar behavior of the local shearing source.

Figure 2:
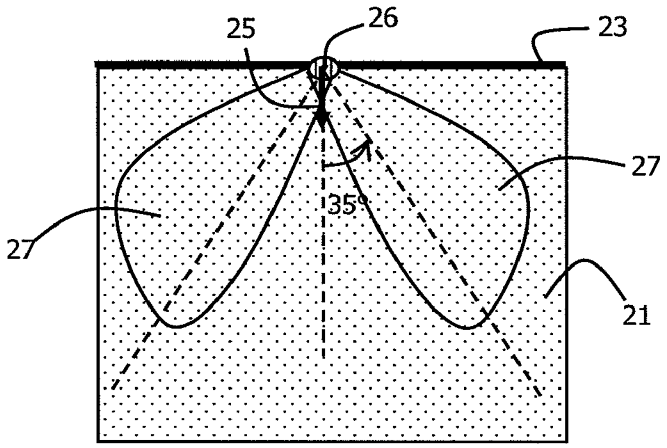

FIG. 2 schematically illustrates the directivity of shearing waves generated by a source zone 26, on which ultrasound waves are focussed, located on an interface 23 placed at the surface of a medium 21.

The ultrasound radiation force 25 generates shearing waves according to directivity lobes 27 and 27', whereof the maxima are located at 35° from the normal at the interface 23 and illustrating these mechanical shearing waves.

In fact, in a large-size medium, the principal lobe is located at 35° relative to the normal at the interface 23 in the case of a medium whereof the mechanical characteristics are typical of biological tissues.

It is thus evident that to maximize the amplitude of the shearing wave in a defined spatial zone of particular interest it is pertinent to place the local shearing source at 35° relative to this zone.

It is also known that the compression wave spreads at very high velocity and it is observed for example that $c_L \approx 300 c_T$ where $c_T$ is the speed of the shearing wave and $c_L$ that of the compression wave. To the extent where mechanical pulse has to be short to be imaged, the compression wave will therefore have a tendency to escape very rapidly from the imaged region.

It is enough therefore to reach some tens of microseconds, for example 30 μs approximately for a zone situated at a depth of 4 cm, so that the shift field is no more than the manifestation of the other velocity waves approximately equal to the velocity of the shearing waves.

The head wave ensures continuity of the stresses and has a zero amplitude at the interface. It spreads at the surface in the form of a compression wave, by yielding part of its energy in volume in the form of a shearing wave in a determined direction. This specific angle is given by the formula $$\theta = a\sin\left(\frac{c_T}{c_L}\right),$$

where $c_T$ is the speed of the shearing wave and $c_L$ that of the compression wave.

Yet, the speed values of the shearing and compression waves are respectively of the order of 5 m/s and 1500 m/s. Consequently, the specific angle is quasi zero and this head wave does not penetrate the medium. It will therefore not be observable since imaging is done in depth, even slight, in the medium.

The surface wave, or Rayleigh wave R, is in reality likely to be detected in volume since it has a normal evanescent component, according to the axis Z. This component extends over a depth of around a wavelength, or around 1 cm in the biological media.

The propagation speed of this surface wave is given with high precision by the Viktorov formula:

$$\frac{c_R}{c_T} = \frac{0.718 - (c_T/c_L)^2}{0.75 - (c_T/c_L)^2} = \frac{0.718 - (5/1500)^2}{0.75 - (5/1500)^2} = 0.95,$$

where $c_R$ is the speed of the surface wave.

The surface wave therefore has a speed nearly identical to that of the shearing waves.

It is consequently evident that it is not really possible to temporarily separate the wave R and the shearing wave. However, here also, since imaging is done at even slight depth this wave does not superpose on the shearing waves. Also, even in the event of superposition at the shearing wave, its presence will alter measuring of the speed $C_T$ only slightly since $C_R \approx C_T$.

Figure 3:
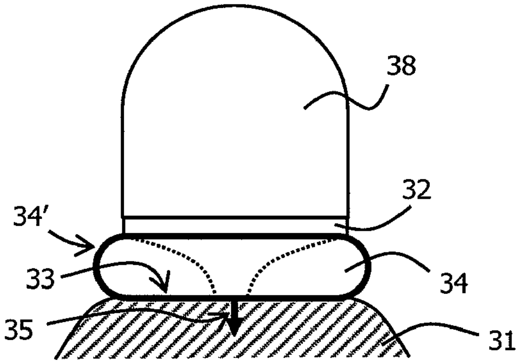
FIG. 3 illustrates a first embodiment of an artificial membrane according to the invention.

FIG. 3 presents a first embodiment of an artificial membrane according to the invention.

This embodiment is particularly adapted to be combined with a method of focussed ultrasound therapy. In fact, such a therapy method requires the presence of a coupling medium between ultrasound transducers and a biological medium. Such a coupling medium is generally a water pocket constituted by a membrane filled with water which can be advantageously used to carry out the invention.

It is obvious that in the presence of such a water pocket it is nearly impossible to generate a shearing wave by direct mechanical contact, precisely because of the coupling medium.

This is harmful when the biological medium is to be imaged by elastography to monitor evolution of the elastic properties associated with treatment progression. In addition, even if it were possible to generate a volume radiation force within the biological medium, the volume radiation pressure possible to generate in the medium would be considerably diminished due to the ultrasound energy loss at the interface between the water pocket and the medium.

The embodiment of the invention presented in FIG. 3 precisely eliminates this disadvantage by generating mechanical shearing waves in a biological medium 31, and this despite the presence of the water pocket.

The assembly presented in FIG. 3 uses an imaging probe 38 bearing ultrasound transducers 32. This imaging probe 38 is applied to a water pocket, defining a coupling medium 34 enclosed by a membrane 34'. The water pocket is placed at the surface of a biological medium 31, for example breast, defining an interface 33.

The method according to the invention uses the interface effect at the level of the membrane 34' to create mechanical waves, more precisely shearing waves in the medium 31.

Then, by imaging these shearing waves, it is possible to realize cartography of the elasticity of the medium 31 observed at any moment.

When the method according to the invention is used during focussed ultrasound treatment, it thus becomes possible to easily follow the variation in elasticity of the treated zone by using one and the same imaging probe 38. Such an imaging probe 38 is programmed not only to effect treatment but also to locally trigger measuring of elasticity by carrying out a step for generating mechanical waves and, successively, a synchronized imaging step of the medium 31.

In addition, the invention enables to adjust the parameters of the interface as a function of observing what is to be done with the medium 31.

In fact, contrary to the volume radiation force which depends mainly on the acoustic parameters of the medium 31 and the intensity of the ultrasound beam, the radiation force 35 generated at the interface 33 between the two media 34 and 31 depends on other parameters likely to be adjusted by the operator. The interfacial radiation force actually depends on the ratio of the acoustic impedances, the ratio of speeds of sound in the two media or even on the thickness of the membrane.

In particular, it is possible to use a membrane material well chosen to adjust these parameters so as to amplify the radiation pressure at the interface 33.

It is also prudent for the acoustic impedances of the two media 31 and 34 to be adjacent, but for the two media 31 and 34 to have very different speeds of sound. This creates greater radiation pressure, at the same time avoiding reflections at the interface 33 harmful to ultrasound imaging.

With this in mind, an elastic membrane filled either with silicone, or chloroform, or even mono chlorobenzene, or nitromethane or even potassium will be used advantageously.

These latter materials have, in effect, acoustic impedances close to those of the biological media, but very different speeds of sound.

Figure 4A:
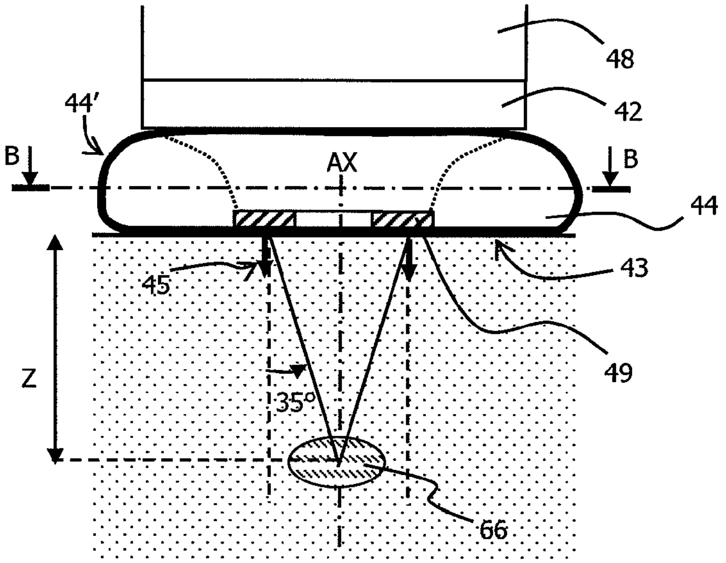
FIGS. 4*a* and 4*b* illustrate in section and in partial plan view a second embodiment of an artificial membrane according to the invention.

FIG. 4 illustrates a second embodiment of an artificial membrane according to the invention. In this embodiment, the membrane 44' making up the interface 43, is such that it is possible to confine and amplify the amplitude and directivity of the mechanical waves in a zone of interest 66 located in a medium 41.

In fact, when several shearing sources vibrating at the surface are placed adequately, this defines a region in which the amplitude of the mechanical wave, and more particularly its axial component, is augmented.

In the example of FIG. 4, a membrane at a non-constant thickness and composition is utilized. Spatialising the surface sources can, in effect, be realized using a membrane whereof the thickness and/or the composition is non-homogeneous at the level of the interface 43 with the medium 41.

FIGS. **4*a* and 4*b* thus describe a particular embodiment for a membrane 44' enclosing a coupling medium 44, suitable for focusing mechanical waves onto a zone of interest 66**.

Figure 4B:
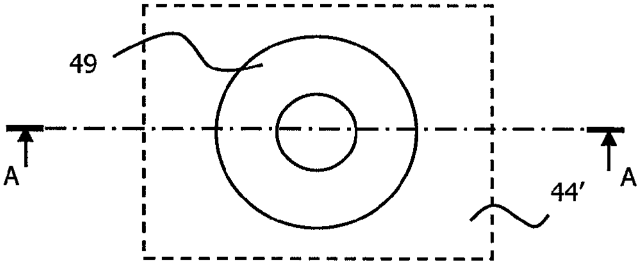

FIG. **4*a* is a section A-A and FIG. 4*b*** is a partial plan view as seen according to section B-B.

The zone of interest 66 is situated at a depth Z and the characteristics of the membrane 44' are determined as a function of this depth Z in terms of thickness or composition. In the example of FIG. 4, the thickness of the membrane 44' has increased on a crown zone 49 illustrated in FIG. **4*b*, such that the zone of interest 66 and the crown 49** form a cone of around 35°.

When an acoustic wave is sent to the membrane 44', substantial axial shifts occur, via acoustic radiation force 45, at the level of the crown 49, since the membrane thickness or the membrane composition have been optimized locally for this reason.

By way of symmetry about the axis AX of revolution of the crown 49, the axial shifts are added and, by propagation, are of maximum amplitude in the zone of interest 66, placed in each of the main emission lobes of the membrane sources.

It is evident that there are different possibilities for constituting the membrane to attain zones of interest 66 of distinct depths Z.

It is also noted that the heterogeneities of the membrane 44' can be done according to variable geometries, not only in a crown, but also in a rectangle, etc. In place of a continuous relief surface, spikes can also be placed in a crown.

Figure 5:
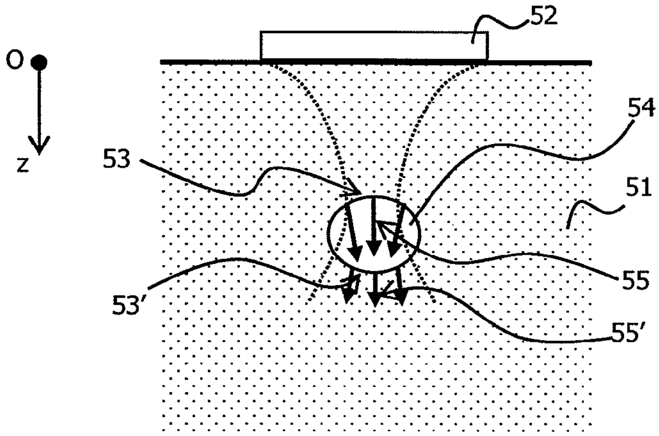
FIG. 5 illustrates a particular embodiment of the invention.

Finally, FIG. 5 shows a particular embodiment of the invention where a biological interface 53 present within a biological medium 51 is utilized according to the inventive method. According to the invention, transducers 52 are utilized to apply ultrasound waves focussed at the level of the interface 53, that is, at the depth of the interface and in the direction of the latter.

By an interface effect, ultrasound waves generate a surface radiation force 55 which causes mechanical shearing waves within a biological medium 54 included in the biological medium 51. The transducers 52 are then utilized to image the propagation of these shearing waves and deduce from this observation the mechanical properties of the medium 54.

It can be noted that, when the method according to the invention is utilized, as shown in FIG. 5, to characterize a biological medium 54 present in the biological medium 51, mechanical properties of the medium 51 can be deduced therefrom also. In fact, not only does the second interface 53' present in the direction Oz also generate shearing waves within the medium 51, but also the size of the biological medium 54 is generally such that the shearing waves generated at the interface 53 also propagate in the medium 51. In imaging the whole medium, properties can be deduced on each of the media 51 and 54 and on their interface 53, 53'.

It is finally evident that various executions can be carried out according to the principles of the invention, such as defined in the following claims.

What is claimed is:

1. A method for generation generating and imaging of mechanical waves within a viscoelastic medium, comprising:

a step for utilizing acoustic force generating means for generating an acoustic radiation force within the viscoelastic medium by the application of focalized acoustic waves focused on an interface delimiting two zones having distinct acoustic properties, the acoustic radiation force causing the propagation of precisely generated mechanical waves in the viscoelastic medium;

coupled with an imaging step of the medium, the coupling being such that propagation of the mechanical waves generated in the medium is imaged, the step for generating being carried out by application of acoustic waves focused on an interface delimiting two zones having distinct acoustic properties coupling an imaging modality to the acoustic force generating means; and utilizing the coupled imaging modality to provide an image of the propagation of the precisely generated mechanical waves.

2. The method according to claim 1, wherein the acoustic waves are ultrasound waves.

3. The method according to claim 1, wherein the interface the acoustic waves on which are focused is an interface present between two zones of distinct acoustic properties present within the viscoelastic medium.

4. The method according to claim 1, wherein the interface on which the acoustic waves are focused is an artificial membrane placed in contact with the surface of the viscoelastic medium and enclosing a medium known as coupling medium placed between a device for applying the acoustic waves and the surface of the viscoelastic medium, the coupling medium and the viscoelastic medium defining two zones of distinct acoustic properties.

5. The method according to claim 4, wherein the artificial membrane has a composition selected to minimize the acoustic impedance contrast while increasing the amplitude of the mechanical waves.

6. The method according to claim 4, wherein the artificial membrane has thickness selected to minimize the acoustic impedance contrast while increasing the amplitude of the mechanical waves.

7. The method according to claim 4, wherein the artificial membrane has a non-uniform composition determined spatially so as to increase the amplitude of the mechanical waves in a region of interest of the viscoelastic medium.

8. The method according to claim 4, wherein the artificial membrane has a non-uniform thickness determined spatially so as to increase the amplitude of the mechanical waves in a region of interest of the viscoelastic medium.

9. The method according to claim 1, wherein application of acoustic waves focused on the interface is completed successively at a plurality of points of the interface, this plurality of points and the succession of the focussings being determined so as to increase the amplitude of the mechanical waves in a region of interest of the viscoelastic medium.

10. The method according to claim 1, wherein said method is coupled with a method of ultrasound treatment for monitoring the effect of the treatment.

11. The method according to claim 10, wherein the ultrasound treatment method is suitable for being controlled as a function of the results of the imaging step of the medium.

12. An artificial membrane having a composition and/or a thickness selected to minimize the acoustic impedance contrast while increasing the amplitude of the mechanical waves intended to be placed partially in contact with the surface of a viscoelastic medium and intended to enclose a medium known as coupling medium placed between a device for generation of acoustic waves and a viscoelastic medium to serve as interface during execution of a method according to one of the preceding claims.

* * * * *